(12) United States Patent
Koehler et al.

(10) Patent No.: US 11,157,053 B2
(45) Date of Patent: Oct. 26, 2021

(54) AUXILIARY MODULE POWER SUPPLY

(71) Applicant: Hewlett-Packard Development Company, L.P., Spring, TX (US)

(72) Inventors: Duane A Koehler, Vancouver, WA (US); Kevin Lo, Vancouver, WA (US); Benjamin Whitney Griffith, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 183 days.

(21) Appl. No.: 16/609,529

(22) PCT Filed: May 1, 2017

(86) PCT No.: PCT/US2017/030343
§ 371 (c)(1),
(2) Date: Oct. 30, 2019

(87) PCT Pub. No.: WO2018/203870
PCT Pub. Date: Nov. 8, 2018

(65) Prior Publication Data
US 2020/0064896 A1      Feb. 27, 2020

(51) Int. Cl.
*G03G 15/20* (2006.01)
*G06F 1/26* (2006.01)
*H02J 3/00* (2006.01)
*B41J 29/38* (2006.01)

(52) U.S. Cl.
CPC .............. *G06F 1/266* (2013.01); *H02J 3/00* (2013.01); *B41J 29/38* (2013.01)

(58) Field of Classification Search
CPC .... G03G 15/20; G03G 15/5004; G03G 15/80; G06F 1/266; B41F 29/38

USPC ...................................... 399/75, 88; 713/300
See application file for complete search history.

(56) References Cited

U.S. PATENT DOCUMENTS

| | | | |
|---|---|---|---|
| 5,815,771 | A | 9/1998 | Dhande et al. |
| 6,317,571 | B1 | 11/2001 | Adams |
| 6,768,884 | B1 | 7/2004 | Buchheit |
| 6,944,689 | B2 | 9/2005 | Billington |

(Continued)

FOREIGN PATENT DOCUMENTS

| | | |
|---|---|---|
| JP | 2002278352 | 9/2002 |
| JP | 2005148581 A | 6/2005 |
| JP | 2013038607 A | 2/2013 |

OTHER PUBLICATIONS

"Linear (unregulated) Power Supplies for CNC Machines", http://www.tinycontrols.com/, 2014 ~ 3 pages.

(Continued)

*Primary Examiner* — Hoan H Tran
(74) *Attorney, Agent, or Firm* — HP Inc. Patent Department

(57) ABSTRACT

An example auxiliary module includes an external power supply interface to couple to an external power source, at least one subsystem to operate using power from the external power source, and a power controller coupled to the external power supply interface. The at least one subsystem is to receive control signals from a primary device. The power controller includes circuitry to provide power from the external power source to the at least one subsystem. The power controller is to further provide power control signals to the primary device.

15 Claims, 4 Drawing Sheets

(56) References Cited

U.S. PATENT DOCUMENTS

| | | | |
|---|---|---|---|
| 7,619,759 B1 * | 11/2009 | Mishima | H04N 1/00278 358/1.14 |
| 7,667,724 B2 | 2/2010 | May | |
| 8,019,247 B2 * | 9/2011 | Mito | G03G 15/5004 399/69 |
| 8,456,870 B2 | 6/2013 | Cho et al. | |
| 9,207,699 B2 | 12/2015 | Takizawa | |
| 9,258,447 B2 | 2/2016 | Yamakawa | |
| 9,383,952 B1 | 7/2016 | Kramer | |
| 2005/0117706 A1 | 6/2005 | Powell | |
| 2006/0269312 A1 | 11/2006 | Muraishi | |
| 2007/0132797 A1 | 6/2007 | Jeon | |
| 2011/0276811 A1 * | 11/2011 | Ueda | G06F 1/266 713/300 |

OTHER PUBLICATIONS

Shinji, M. et el., PWM Power Suppiy Control IC "FA8B00 Series" Capable of Handling Peak Loads, 2016 ~ 6 pages https://www.fujielectric.com/.

* cited by examiner

AUXILIARY MODULE POWER SUPPLY

BACKGROUND

Various system, such as imaging devices are powered by plugging the system into an external power supply, such as by plugging into a wall outlet. Such systems may further be coupled with accessories or other components which may also be plugged into a wall outlet for power. For example, an imaging device, such as a printer, may be plugged into a wall outlet. The imaging device may be coupled to an accessory, such as a conditioner, which may be separately plugged into a wall outlet.

BRIEF DESCRIPTION OF THE DRAWINGS

For a more complete understanding of various examples, reference is now made to the following description taken in connection with the accompanying drawings in which.

DETAILED DESCRIPTION

Various examples provide for an auxiliary device which can enhance power management for a primary device. For example, a primary device, such as an imaging system may have a power system to power various subsystems of the imaging system. Various examples of an auxiliary device include a power controller that distributes power to the primary device, as well as to subsystems of the auxiliary device. The auxiliary device may be draw power from an external power source, such as by being plugged into a wall outlet. The auxiliary device includes a power outlet to allow the primary device to be plugged into it, instead of into a wall outlet. In various examples, the auxiliary device may further provide power to an accessory device coupled to the primary device. Thus, only the auxiliary device may be plugged into the external power source and distribute power from the external power source to subsystems of the auxiliary device, the primary device and the accessory device. In this regard, the power controller of the auxiliary device can enhance the power architecture of the primary device and manage power consumption, thereby preventing or reducing overloading of the external power supply.

Figure 1:
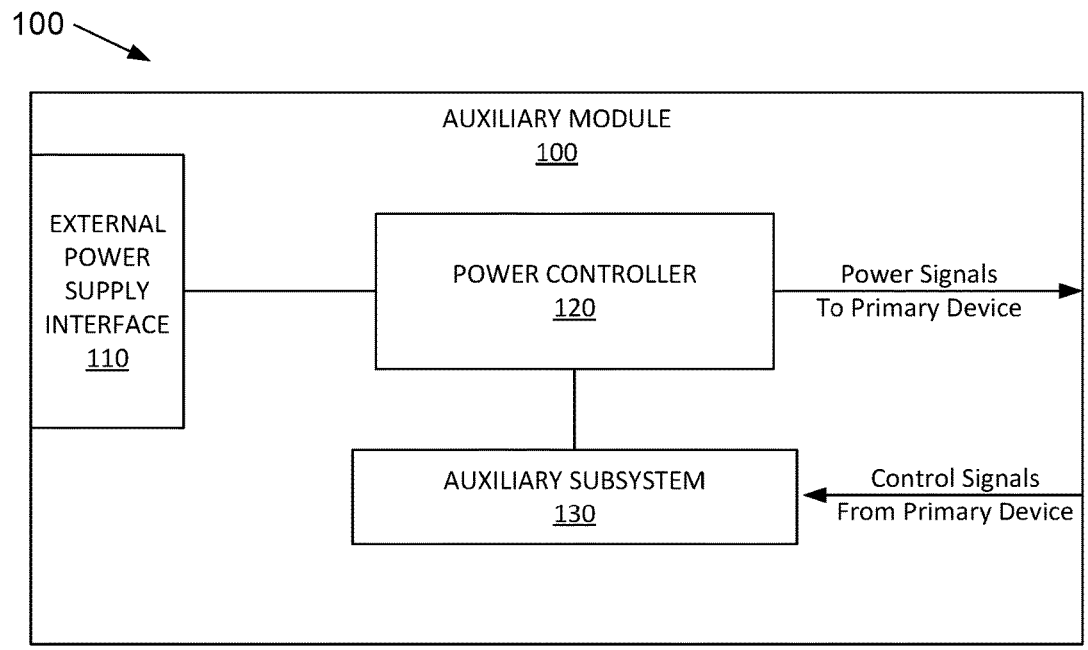
FIG. 1 provides a schematic illustration of an example auxiliary module.

Referring now to the figures, FIG. 1 provides a schematic illustration of an example auxiliary module 100. In various examples, the auxiliary module 100 may be a component that may be coupled to a primary device (not shown). In one example, the auxiliary module 100 is a conditioner that can be coupled to an imaging device, such as a printer. In various examples, a conditioner for an imaging device may be a system which changes certain properties of the print media, for example.

The example auxiliary module 100 of FIG. 1 includes an external power supply interface 110 to couple to an external power source. In various examples, the external power supply interface 110 is an alternating current (AC) power cord, and the external power source may be an electrical outlet into which the AC power cord may be plugged.

The example auxiliary module 100 includes a power controller 120 coupled to the external power supply interface 110. In various examples, the power controller 120 includes circuitry to provide power from the external power source, through the external power supply interface 110, to at least one subsystem, such as the auxiliary subsystem 130. In one example, the example auxiliary module 100 is a conditioner for an imaging device, and the auxiliary subsystem 130 may include a heated pressure roller. Thus, the power controller 120 can provide power from the external source, such as a wall outlet, to the auxiliary subsystem 130.

Further, as indicated in the example of FIG. 1, the auxiliary subsystem 130 is to receive control signals from the primary device (not shown) to which the example auxiliary module 100 is coupled. In this regard, the auxiliary subsystem 130 of the example auxiliary module 100 may operate, at least in part, based on control signals from the primary device. For example, the heated pressure roller of an auxiliary module 100 may operate under the control of the imaging device to which the auxiliary module 100 (e.g., a conditioner) is coupled.

As noted above, the power controller 120 of the example auxiliary module 100 provides power from the external power source to the auxiliary subsystem 130 of the example auxiliary module 100. Further, the power controller 120 includes circuitry to provide power from the external power source to the primary device, as indicated by the arrow from the power controller 120 in FIG. 1. In this regard, the example auxiliary module 100 may include a power outlet to receive a power plug of the primary device. Thus, the primary device may be plugged into the auxiliary module 100, instead of being plugged into a wall outlet, for example.

Figure 2:
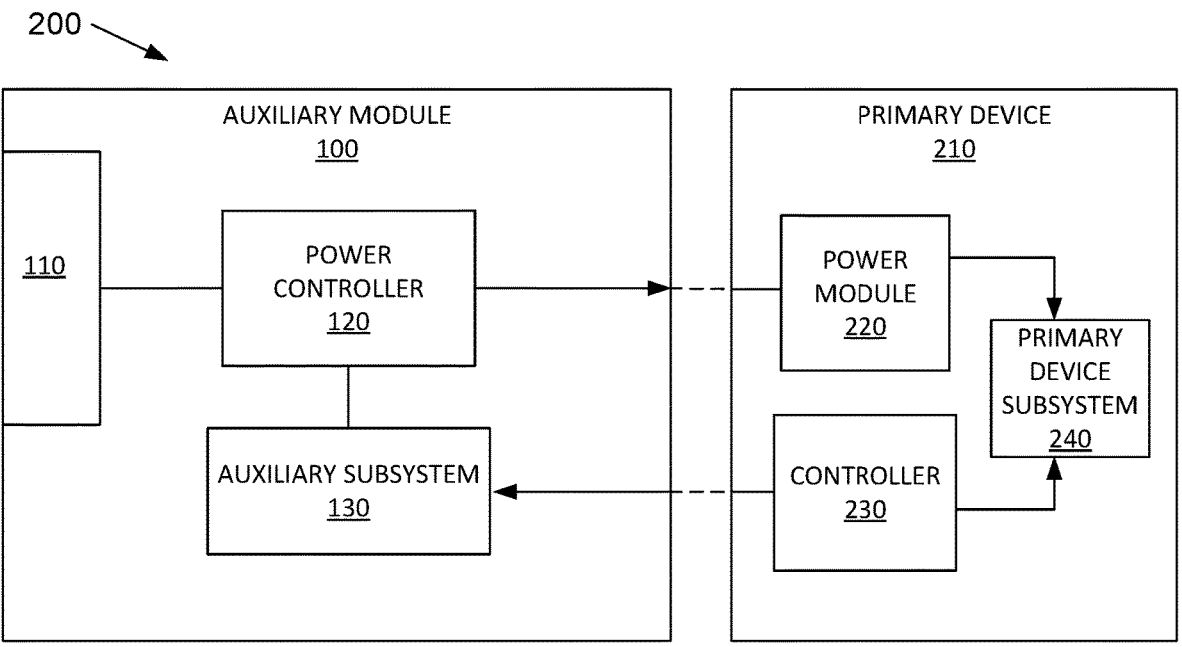
FIG. 2 provides a schematic illustration of an example system with the auxiliary module of FIG. 1.

Referring now to FIG. 2, a schematic illustration of an example system 200 with the example auxiliary module 100 of FIG. 1 is provided. In the example system 200, the example auxiliary module 100 of FIG. 1 is shown coupled to a primary device 210. As noted above, the primary device 210 may be an imaging system, such as a printer, copier, fax machine, multi-function device or the like. The example primary device 210 of FIG. 2 includes a power module 220 to receive power from an external source. In this regard, an external source for the power module 220 is a power source that is external to the primary device 210. In the example system 200 of FIG. 2, the power module 220 is coupled to the power controller 120 of the example auxiliary module 100. In this regard, the power module 220 receives power, or power signals, from or through the power controller 120 of the example auxiliary module 100. For example, the power module 220 of the primary device 210 may include an AC plug, and the power controller 120 of the example auxiliary module 100 may include an AC outlet to receive the AC plug of the primary device 210.

The primary device 210 of FIG. 2 further includes a controller 230. The controller 230 provides control signals to at least one subsystem of the primary device 210, such as the primary device subsystem 240 shown in FIG. 2. As noted above, in some examples, the primary device 210 is an imaging system. In such examples, the primary device subsystem 240 may be an image forming portion for forming an image on a print media, for example. The controller 230 may be provided to control operation of the primary device subsystem 240 and/or other various subsystems provided in the primary device 210. Further, the primary device subsystem 240 and/or other various subsystems of the primary device 210 may operate using power provided from the power module 220 of the primary device. As noted above, the power module 220 may, in turn, receive power through the auxiliary module 100.

As noted above with reference to FIG. 1, the auxiliary subsystem 130 of the example auxiliary module 100 is to receive control signals from a primary device to which the example auxiliary module 100 is coupled. As illustrated in FIG. 2, the auxiliary subsystem 130 of the example auxiliary module 100 receives control signals from the controller 230 of the primary device 210. Thus, the controller 230 of the primary device 210 may control operation of the primary device subsystem 240 and/or other various subsystems provided in the primary device 210, as well as the auxiliary subsystem 130 and/or other subsystem of the example auxiliary module 100.

Figure 3:
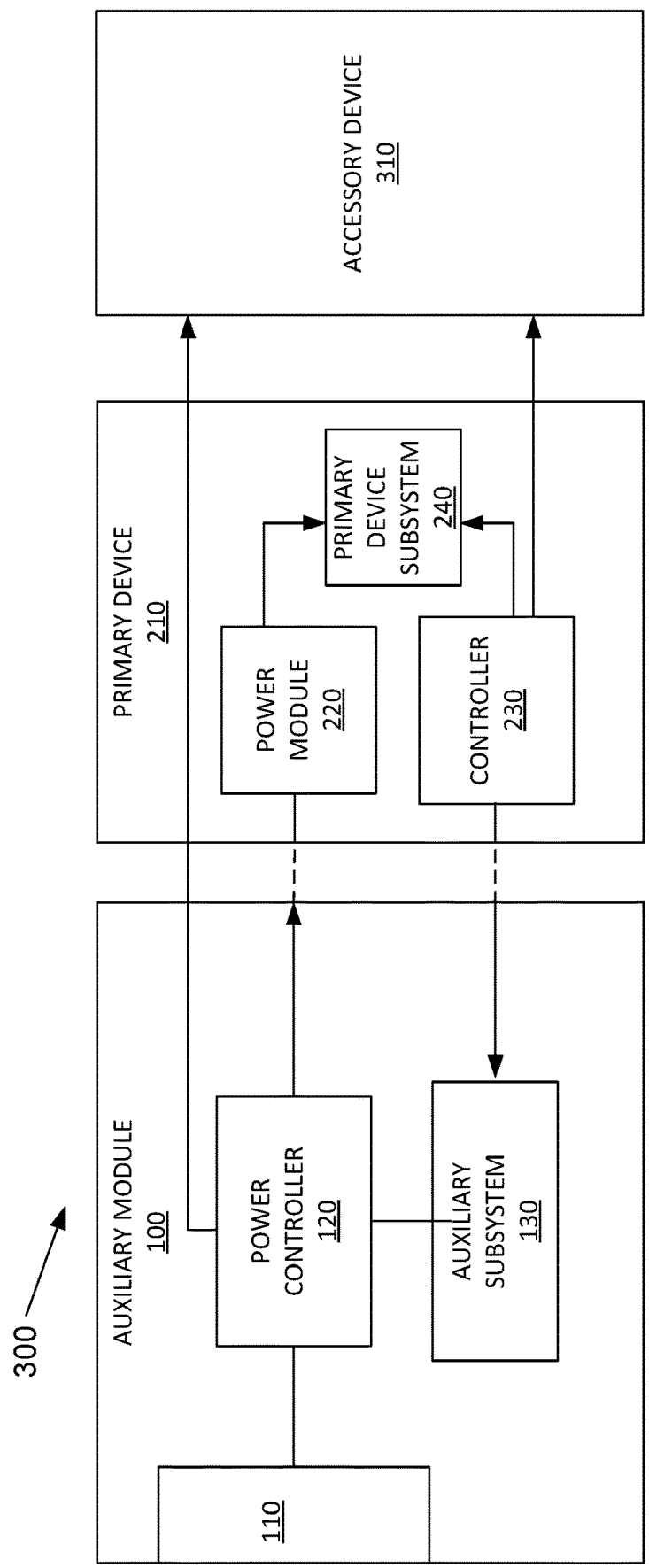
FIG. 3 provides a schematic illustration of the example system of FIG. 2 with an accessory device.

Referring now to FIG. 3, a schematic illustration of the example system of FIG. 2 is illustrated with an accessory device 310 coupled to the primary device 210. The accessory device 310 may be coupled to the primary device 210 in any of a number of manners. For example, the coupling of the primary device 210 and the accessory device 310 may be achieve through a universal serial bus (USB) cable or another connection that may be proprietary to the manufacturer of the primary device 210 and/or the accessory device 310. In one example, the primary device 210 may be an imaging device, and the accessory device 310 may be finisher for the imaging device.

As illustrated in FIG. 3, in the example system 300, the accessory device 310 receives control signals from the controller 230 of the primary device 210. Thus, the accessory device 310 may operate under the control of the controller 230 of the primary device 210. In this regard, the controller 230 may coordinate or integrate operation of the accessory device 310, various subsystems of the primary device (e.g., the primary device subsystem 240) and various subsystems of the example auxiliary module 100 (e.g., the auxiliary subsystem 130).

Further, as illustrated in FIG. 3, in the example system 300, the accessory device 310 may receive power from the power controller 120 of the auxiliary module 100. Thus, the power controller 120 of the example auxiliary module 100 may distribute power from the external power source to the accessory device 310, various subsystems of the primary device (e.g., the primary device subsystem 240) and various subsystems of the example auxiliary module 100 (e.g., the auxiliary subsystem 130).

Figure 4:
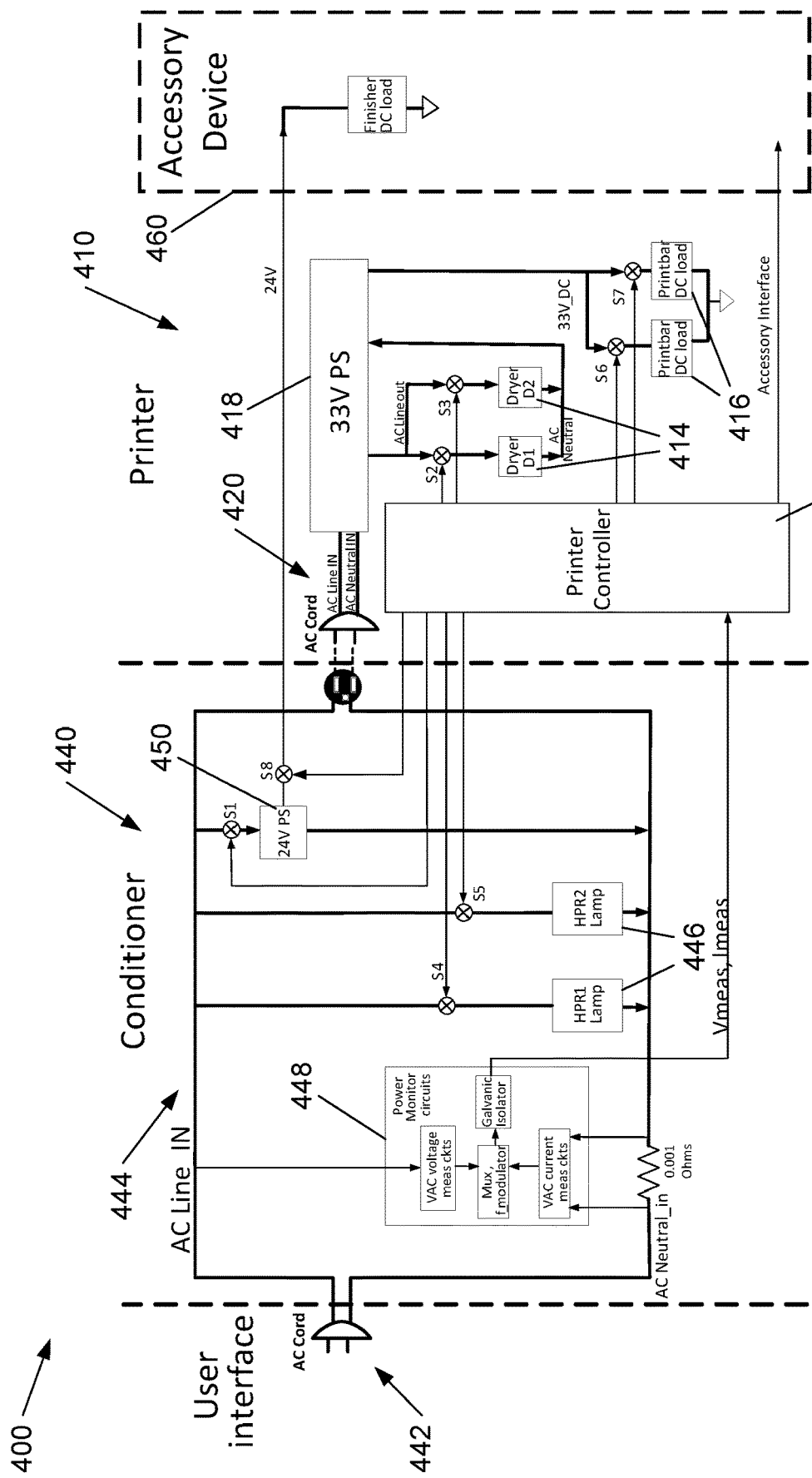
FIG. 4 illustrates a circuit diagram of an example system.

Referring now to FIG. 4, a circuit diagram of an example system 400 is illustrated. The example system 400 includes a printer 410 which includes a printer controller 412. The printer controller 412 controls operation of the printer 410, including various subsystems of the printer 410, as well as operation of any auxiliary or accessory devices coupled to the printer 410. In the example system 400 of FIG. 4, the printer 410 includes a dryer subsystem 414 and a printbar subsystem 416.

The printer 410 of the example system 400 further includes a power system 418. In the example system 400 of FIG. 4, the power system 418 of the printer 410 includes a 33-volt power supply which is coupled to a power source that is external to the printer 410. The power system 418 controls distribution of power to the various subsystems of the printer 410. As illustrated in the example of FIG. 4, the 33-volt power supply may provide AC power to the dryer subsystem 414 and DC power to the printbar subsystem 416. The power system 418 of the printer 410 is coupled to an external power source through an interface, such as an AC power cord 420.

As noted above, the printer controller 412 controls operation of the various subsystems. In this regard, in the example system 400 of FIG. 4, the printer controller 412 may transmit signals S2, S3 to the dryer subsystem 414 and signals S6, S7 to the printbar subsystem 416.

The example system 400 further includes an auxiliary module in the form of a conditioner 440 coupled to the printer 410. In some examples, the conditioner 440 may be positioned above a print engine of an imaging device, such as the printer 410, for example. The conditioner may be coupled to an external power source through, for example, an AC power cord 442. In various examples, the AC power cord 442 of the conditioner 440 may be plugged into a wall outlet (not shown) or other external power source for AC power. In one example, the external power source is a 15 amp AC power source.

The conditioner 440 of the example system 400 includes circuitry 444 to distribute power from the external power source, through the AC power cord 442, to various subsystems of the conditioner 440. For example, in the example illustrated in FIG. 4, the circuitry 444 allows distribution of power to a heated pressure roller (HPR) subsystem which includes HPR lamps 446. In other examples, the HPR lamps may be replace with ceramic heaters or other heating devices for the HPR subsystem. In the example system 400 of FIG. 4, the circuitry 444 provides a 24-volt power source to power the HPR subsystem and/or various other subsystems of the conditioner 440.

The HPR subsystem and/or various other subsystems of the conditioner 440 operate under the control of the printer controller 412 of the printer 410. In this regard, in the example system 400 of FIG. 4, the printer controller 412 may transmit signals S4, S5 to the HPR lamps 446 of the HPR subsystem.

The conditioner 440 of the example system 400 of FIG. 4 further includes power monitor circuits 448 to measure various voltages, currents and/or other parameters related to power. As illustrated by the arrow in FIG. 4, various measurements from the power monitor circuits 448 are transmitted from the conditioner 440 to the printer controller 412 of the printer 410. In this regard, the printer controller 412 may use the power information as factors in operation of various subsystems of the printer 410 and the conditioner 440. For example, the printer controller 412 may vary operation to avoid overload of power systems.

The example system 400 further includes an accessory device 460, which may be finisher for the printer 410. In one example, the accessory device 460 may be a floor-standing device that is separate from the printer 410 and is connected, for example, via at least one cable (e.g., USB cable). In the example system 400 of FIG. 4, the accessory device 460 receives control signals from the printer controller 412 of the printer. Power for operation of the accessory device 460 in the example system 400 is provided through the conditioner 440. For example, as illustrated in FIG. 4, power for operation of the accessory device 460 is provided through the circuitry 444 of the conditioner via a 24-volt power supply 450. In the example of FIG. 4, the power is supplied to a finisher, which may represent a 24-volt DC load.

Figure 5:
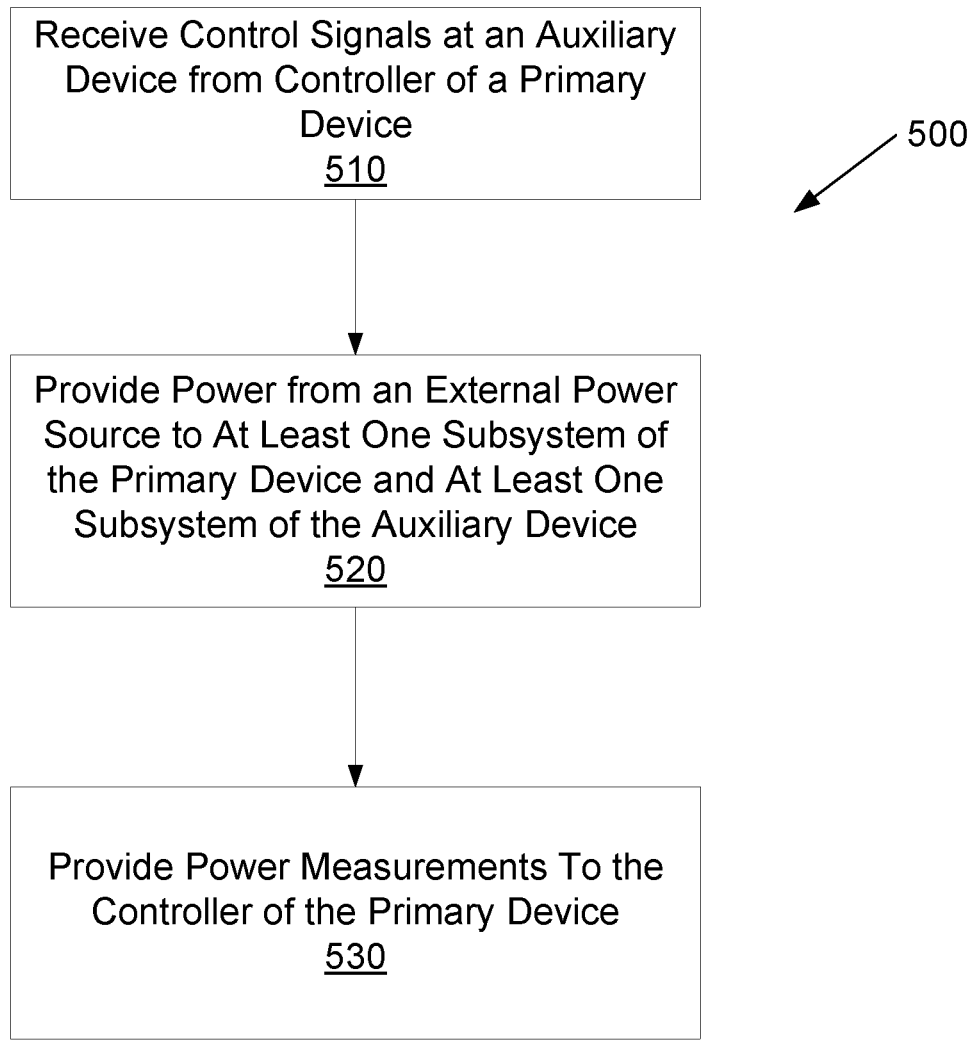
FIG. 5 is a flow chart illustrating an example method for providing power through an auxiliary device.

Referring now to FIG. 5, a flow chart illustrates an example method for providing power through an auxiliary device. The example method 500 may be implemented in an auxiliary device, such as the conditioner 440 described above with reference to FIG. 4. In the example method 500 of FIG. 5, control signals from a controller of a primary device are received at an auxiliary device (block 510). For example, in the example system 400 of FIG. 4, the conditioner 440 receives control signals S4, S5 from the printer controller 412 of the printer 410.

In the example method 500, the auxiliary device provides power from an external power source coupled to the auxiliary device to at least one subsystem of the primary device and at least one subsystem of the auxiliary device (block 520). For example, in the example system 400 of FIG. 4, the conditioner 440 provides power from an external power source, via the AC power cord 442, to the HPR subsystem 446 of the conditioner 440 and the dryer subsystem 414 and the printbar subsystem 416 of the printer 410.

Further, in the example method 500 of FIG. 5, the auxiliary device provides power measurements to the controller of the primary device (block 530). For example, in the example system 400 of FIG. 4, the conditioner 440 provides power measurements from the power monitor circuits 448 to the printer controller 412 of the printer 410.

Thus, in various systems, an auxiliary device can upgrade the power system (e.g., power distribution or power management system) of a primary device. Various examples of the auxiliary device can prevent or reduce overload of power systems.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

It is also noted herein that while the above describes examples, these descriptions should not be viewed in a limiting sense. Rather, there are several variations and modifications which may be made without departing from the scope as defined in the appended claims.

What is claimed is:

1. An auxiliary module, comprising:
   an external power supply interface to couple to an external power source;
   at least one subsystem to operate using power from the external power source, the at least one subsystem to receive control signals from a primary device; and
   a power controller coupled to the external power supply interface, the power controller including circuitry to provide power from the external power source to the at least one subsystem, the power controller to further provide power control signals to the primary device.

2. The auxiliary module of claim 1, wherein the power controller is to further provide power to the primary device to power a primary device subsystem.

3. The auxiliary module of claim 1, wherein the primary device is an imaging system.

4. The auxiliary module of claim 3, wherein the at least one subsystem is a conditioner for the imaging system.

5. The auxiliary module of claim 1, wherein the power controller is to further provide power to an accessory device coupled to the primary device.

6. The auxiliary module of claim 5, wherein the primary device is an imaging system and the accessory device is a finisher for the imaging system.

7. A system, comprising:
   a primary device comprising:
     a power module to receive power from a source external to the primary device;
     a primary device subsystem to operate using power from the power module; and
     a controller to provide control signals to the primary device subsystem;
   an auxiliary device comprising:
     an external power supply interface to couple to an external power source;
     at least one auxiliary subsystem to operate using power from the external power source, the at least one subsystem to receive control signals from the controller of the primary device; and
     a power controller coupled to the external power supply interface, the power controller to provide power from the external power source to the at least one auxiliary subsystem and the primary device subsystem, the power controller to further provide power control signals to the power module of the primary device.

8. The system of claim 7, wherein the primary device is an imaging system.

9. The system of claim 8, wherein the at least one auxiliary device subsystem is a conditioner for the imaging system.

10. The system of claim 7, further comprising:
    an accessory device coupled to the primary device, wherein the power controller of the auxiliary device is to provide power to the accessory device.

11. The system of claim 10, wherein the primary device is an imaging system and the accessory device is a finisher for the imaging system.

12. A method, comprising:
    receiving, at an auxiliary device, control signals from a controller of a primary device;
    provide power from an external power source coupled to the auxiliary device to at least one subsystem of the primary device and at least one subsystem of the auxiliary device; and
    provide power measurements to the controller of the primary device.

13. The method of claim 12, wherein the primary device is an imaging system and the auxiliary device includes a conditioner for the imaging system.

14. The method of claim 12, further comprising:
    receiving, at the auxiliary device, control signals from the controller of the primary device to provide power to an accessory device coupled to the primary device; and
    provide power to the accessory device,
    wherein the accessory device receives control signals from the controller of the primary device.

15. The method of claim 14, wherein the primary device is an imaging system and the accessory device is a finisher for the imaging system.

* * * * *